United States Patent [19]

Bando

[11] Patent Number: 5,400,939
[45] Date of Patent: * Mar. 28, 1995

[54] MACHINE FOR BREAKING GLASS PLATE

[75] Inventor: Shigeru Bando, Tokushima, Japan

[73] Assignee: Bando Kiko Co., Ltd., Tokushima, Japan

[ * ] Notice: The portion of the term of this patent subsequent to Apr. 12, 2011 has been disclaimed.

[21] Appl. No.: 166,933

[22] Filed: Dec. 15, 1993

Related U.S. Application Data

[62] Division of Ser. No. 979,859, Feb. 23, 1993, Pat. No. 5,301,867.

[30] Foreign Application Priority Data

Sep. 7, 1991 [JP] Japan .................. 3-255754
Mar. 23, 1992 [JP] Japan .................. 4-97131

[51] Int. Cl.[6] ............ B65H 35/10; C03B 33/03
[52] U.S. Cl. ................... 225/104; 225/96.5; 225/97
[58] Field of Search .............. 225/104, 96.5, 97, 103, 225/2, 94; 83/879, 880

[56] References Cited

U.S. PATENT DOCUMENTS

| | | | |
|---|---|---|---|
| 3,216,635 | 11/1965 | Lefevre | 225/96.5 |
| 3,917,139 | 11/1975 | Kabanov et al. | 225/96.5 |
| 4,646,955 | 3/1987 | Garrick et al. | 225/103 |
| 4,698,088 | 10/1987 | Bando | 225/93.5 |
| 5,221,034 | 6/1993 | Bando | 225/96.5 |
| 5,301,867 | 4/1994 | Bando | 225/104 |

Primary Examiner—Kenneth E. Peterson
Attorney, Agent, or Firm—Nixon & Vanderhye

[57] ABSTRACT

A glass plate breaking machine 1 comprises a flexible endless belt 3 on which a glass plate 2 is placed; a glass plate receiver 4 disposed inside the endless belt 3; a moving unit 5 for moving the glass plate receiver 4 in an X direction and in a Y direction perpendicular to the X direction; a breaking unit 6 disposed above the endless belt 3; a moving unit 7 for moving the breaking unit 6 in the X direction and the Y direction perpendicular to the X direction; and a controller for controlling the operation of the moving unit 5 such that the position of the glass plate receiver 4 moved by the moving unit 5 corresponds to the position of the breaking unit 6, in the breakage of the glass plate 2 by the braking unit 6; a travel unit 8 for travelling the belt 3; and a lifter 9 for lifting the glass plate 2.

9 Claims, 6 Drawing Sheets

MACHINE FOR BREAKING GLASS PLATE

This is a divisional of application Ser. No. 07/979,859, filed Feb. 23, 1993, now U.S. Pat. No. 5,301,867.

TECHNICAL FIELD

The present invention relates to a machine for breaking a glass plate.

BACKGROUND ART

In a glass plate breaking machine, a glass plate with a breaking line formed beforehand thereon is placed on an endless belt, a breaking unit is moved along the breaking line on the glass plate in a plane parallel to the surface of the glass plate over the glass plate, while a glass plate receiver is moved below the glass plate in correspondence to the movement of the breaking unit.

In the conventional glass plate breaking machine, the glass plate receiver is moved in correspondence to the movement of the breaking unit below the glass plate and more particularly on the inner side of the endless belt, so that a support plate which supports the endless belt is required to have a large window (opening). As a result, that portion of the endless belt on which the glass plate is placed is difficult to support wholly from below, so that it is supported only at its peripheral portion and as a result the belt would hang at its middle portion. In that case, the movement of the glass plate receiver is difficult to move below the belt. If the receiver is forcedly moved, the glass plate receiver would be caught by the belt to thereby damage same.

The glass plate receiver of the conventional glass plate breaking machine has a fixed step. A cutter blade is pressed against that portion of a glass plate supported by an upper surface, which defines the fixed step, to form an end cutting line (auxiliary cutting line) on the glass plate. The fixed step is then disposed along the breaking line on the glass plate with the end cutting lines formed. A push rod then presses the glass plate against a lower surface, which defines the fixed step, to break the glass plate along its breaking line.

With the glass plate receiver with the upper and lower surfaces provided through the fixed step, as mentioned above, it is only the upper surface surrounded substantially by the lower surface that can support that portion of the glass plate pressed by the cutter blade when the end cutting line is formed. Therefore, the cutter blade must be positioned relative to the upper surface. As a result, the accuracy of relatively positioning the cutter blade must be increased. Since it is the upper surface having a small area surrounded by the lower surface that can support the glass plate, support is unstable.

Such a problem arises not only with glass plates but also with general plate-like members to be broken.

In view of the above problems, the present invention has been made. It is an object of the present invention to provide a glass plate breaking machine which minimizes hanging down of the endless belt, and is capable of supporting that portion of a glass plate, on which the breaking unit acts, with the glass plate receiver as desired without damaging the plate.

It is another object of the present invention to provide a glass plate breaking machine which provides a widened support surface which supports that portion of a glass plate pressed by the cutter blade, ensuring support of the glass plate in a stabilized manner without increasing greatly the accuracy of relatively positioning the cutter blade and a support surface which supports that portion of the glass plate pressed by the cutter blade.

DISCLOSURE OF THE INVENTION

According to the present invention, the above objects are achieved by a glass plate breaking machine comprising: a flexible endless belt on which a glass plate is placed; a travelling means for travelling the endless belt; a belt support plate with a plurality of windows for supporting the endless belt; a plurality of glass plate receiving members, each being disposed at the corresponding window and having a first surface for supporting the glass plate through the belt and a second surface disposed at a lower position than the first surface through a step; a plurality of first moving means each for moving the corresponding glass plate receiving member in a plane parallel to a surface of the glass plate; a breaking means disposed above the endless belt and including a push rod and a cutter blade; a second moving means for moving the breaking means in a plane parallel to a surface of the glass plate; and a controller for controlling an operation of the first and second moving means such that a position of the glass plate receiving member moved by the first moving means corresponds to a position of the breaking means moved by the second moving means in a breaking operation of the breaking means for the glass plate on the belt.

In the present glass plate breaking machine, an end cutting line (auxiliary cutting line) is formed by the cutter blade of the breaking means on the glass plate placed on the endless belt. During the operation of the cutter blade, the first surface of the glass plate receiving member supports the glass plate through the endless belt. After formation of the end cutting line (auxiliary cutting line) the push rod of the breaking means presses the glass plate to break same along the end cutting line (auxiliary cutting line) and a predetermined breaking line. During the operation of the push rod, the first surface of the glass plate receiving member supports the glass plate through the endless belt while the second surface faces the push rod. The respective glass plate receiving member is moved by the first moving means in the corresponding window in the belt support plate in correspondence to the movement of the breaking means.

According to the present invention, the above objects are achieved by a glass plate breaking machine comprising a flexible endless belt on which a glass plate is placed; a travelling means for travelling the endless belt; a belt support plate with a plurality of windows for supporting the endless belt; a glass plate receiving means for supporting the glass plate through the belt; a first moving means for moving the glass plate receiving means in a plane parallel to a surface of the glass plate; a breaking means disposed above the endless belt; a second moving means for moving the breaking means in a plane parallel to the surface of the glass plate; and a controller for controlling an operation of the first and second moving means such that a position of the glass plate receiving means moved by the first moving means corresponds to a position of the breaking means moved by the second moving means in a breaking operation of the breaking means for the glass plate on the belt, the glass plate receiving means being movable to and from a lower surface of the glass plate and having a movable support surface for supporting the glass plate through the belt and a further support surface for supporting the glass plate through the endless belt.

In the present glass plate breaking machine, and end cutting line (auxiliary cutting line) is formed by the cutter blade of the breaking means on the glass plate placed on the endless belt. During the operation of the cutter blade, the movable support surface of the glass plate receiving means is flush with the further support surface, and the movable support surface and the further support surface support the glass plate through the endless belt. After formation of the end cutting line (auxiliary cutting line), the push rod of the breaking means presses the glass plate to break same along the end cutting line (auxiliary cutting line). During the operation of the push rod, the movable support surface of the glass plate receiving means is raised to form a step between the movable support surface and the further support surface such that the step is disposed at the predetermined breaking line. At this time, the movable support surface supports the glass plate through the endless belt while the further surface faces the push rod. The glass plate receiving means is moved by the first moving means in correspondence to the movement of the breaking means.

According to the present invention, the above objects are achieved by a glass plate breaking machine comprising a flexible endless belt on which a glass plate is placed; a travelling means for travelling the endless belt; a belt support plate with a plurality of windows for supporting the endless belt; a plurality of glass plate receiving means each disposed at the corresponding window for supporting the glass plate through the belt; a plurality of first moving means each for moving the corresponding glass plate receiving means in a plane parallel to a surface of the glass plate; a breaking means disposed above the endless belt; a second moving means for moving the breaking means in a plane parallel to a surface of the glass plate; and a controller for controlling an operation of the first and second moving means such that a position of the glass plate receiving means moved by the first moving means corresponds to a position of the breaking means moved by the second moving means in a breaking operation of the breaking means for the glass plate on the belt, the glass plate receiving means each being movable to and from a lower surface of the glass plate and having a movable support surface for supporting the glass plate through the belt and a further support surface for supporting the glass plate through the endless belt.

One example of the first moving means is provided with a moving mechanism for moving the glass plate receiving member or the receiving means in one direction and in a further direction which intersects with the one direction.

One example of the glass plate receiving means is provided with a cylinder means, the movable support surface being provided on a piston rod of that cylinder means, the further support surface being disposed around the movable support surface.

The glass plate to be broken by the breaking machine according to the present invention is general building window glass plates, furniture glass plates and car glass plates such as front glass, rear glass or side glass plates, and other glass plates.

According to the present invention, since the belt support plate with windows supports the flexible endless belt, hanging of the belt is minimized. As a result, the movements of the glass plate receiving member surrounded by the endless belt are not hindered by the hanging belt. Thus, during movement, the glass plate receiving member will not be caught by the endless belt to thereby support the glass plate as desired.

According to the present invention, during the formation of the end cutting line by the cutter blade, the glass plate is supported from below by the movable support surfaces and other support surfaces which are flush with each other, so that even if the relative positioning of the cutter blade and the glass plate receiving means deviates more or less and the cutter blade is disposed on any one of the movable support surfaces and the other support surfaces, a desired end cutting line is formed because the glass plate is supported from below by those support surfaces. In other words, the positioning of the glass plate receiving means relative to the cutter blade does not require a very high accuracy. Since the glass plate is supported from below over a wide area, the glass plate is held in a horizontal plane during the formation of the cutting line.

The present invention will be described in more detail on the basis of a specified embodiment thereof shown in the drawings. Thus, the present and other inventions will be clarified. It is to be noted that the present invention is not limited to these embodiments at all.

EMBODIMENT

Figure 1:
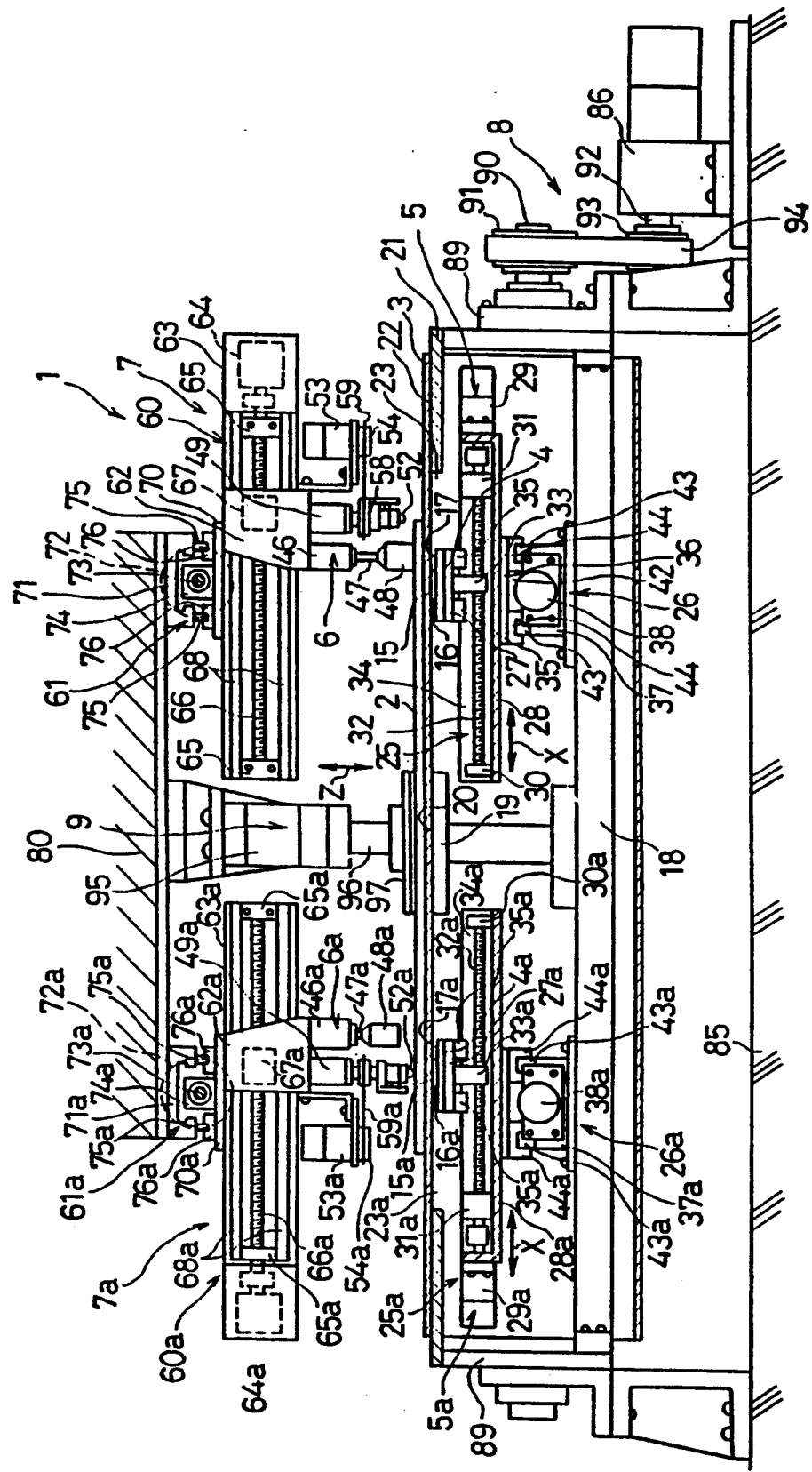
FIG. 1 is a front cross-sectional view of a preferred embodiment of the present invention.
Figure 2:
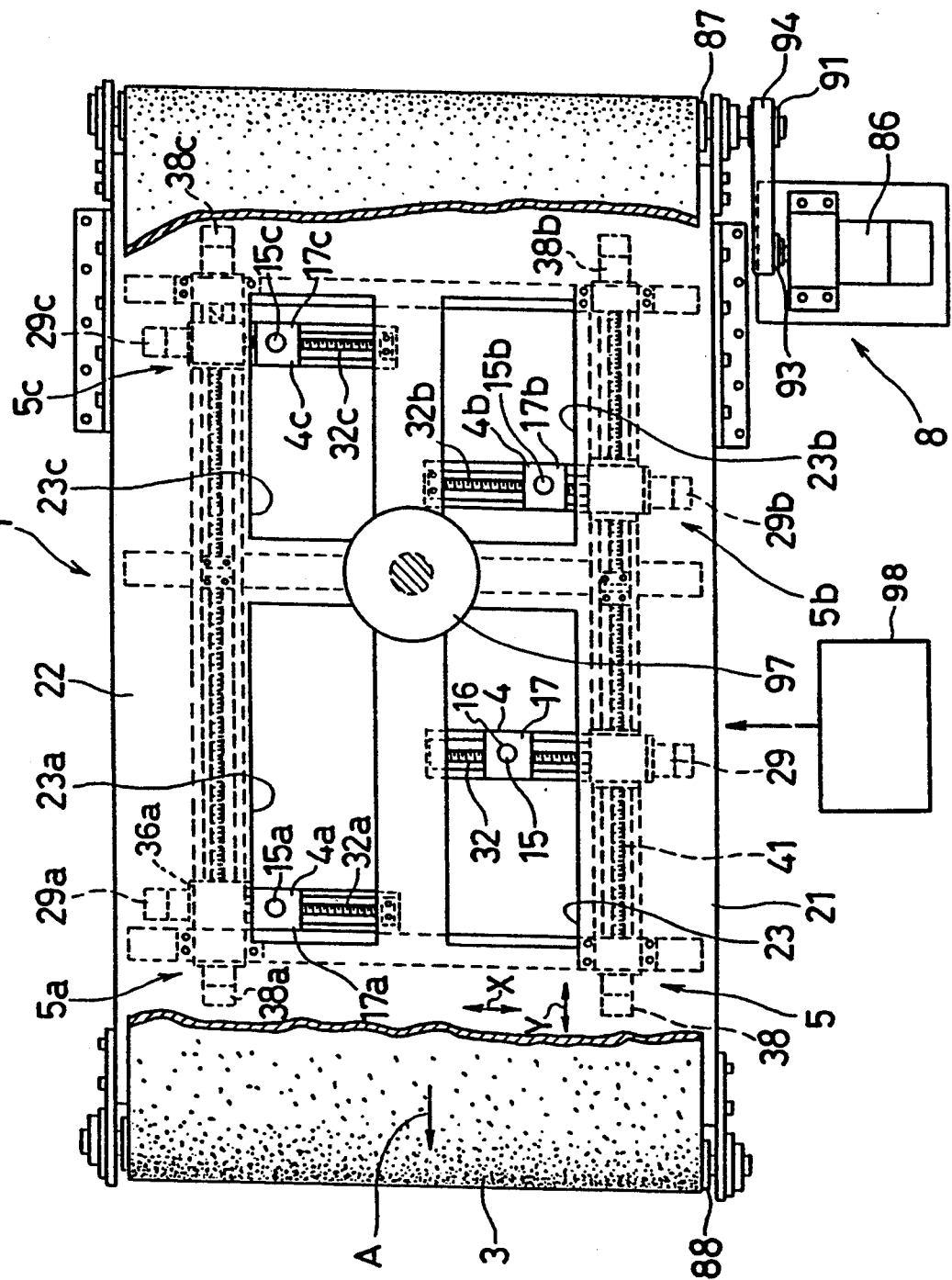
FIG. 2 is a plan view of the embodiment of FIG. 1 with an endless belt being illustrated partly broken away.
Figure 3:
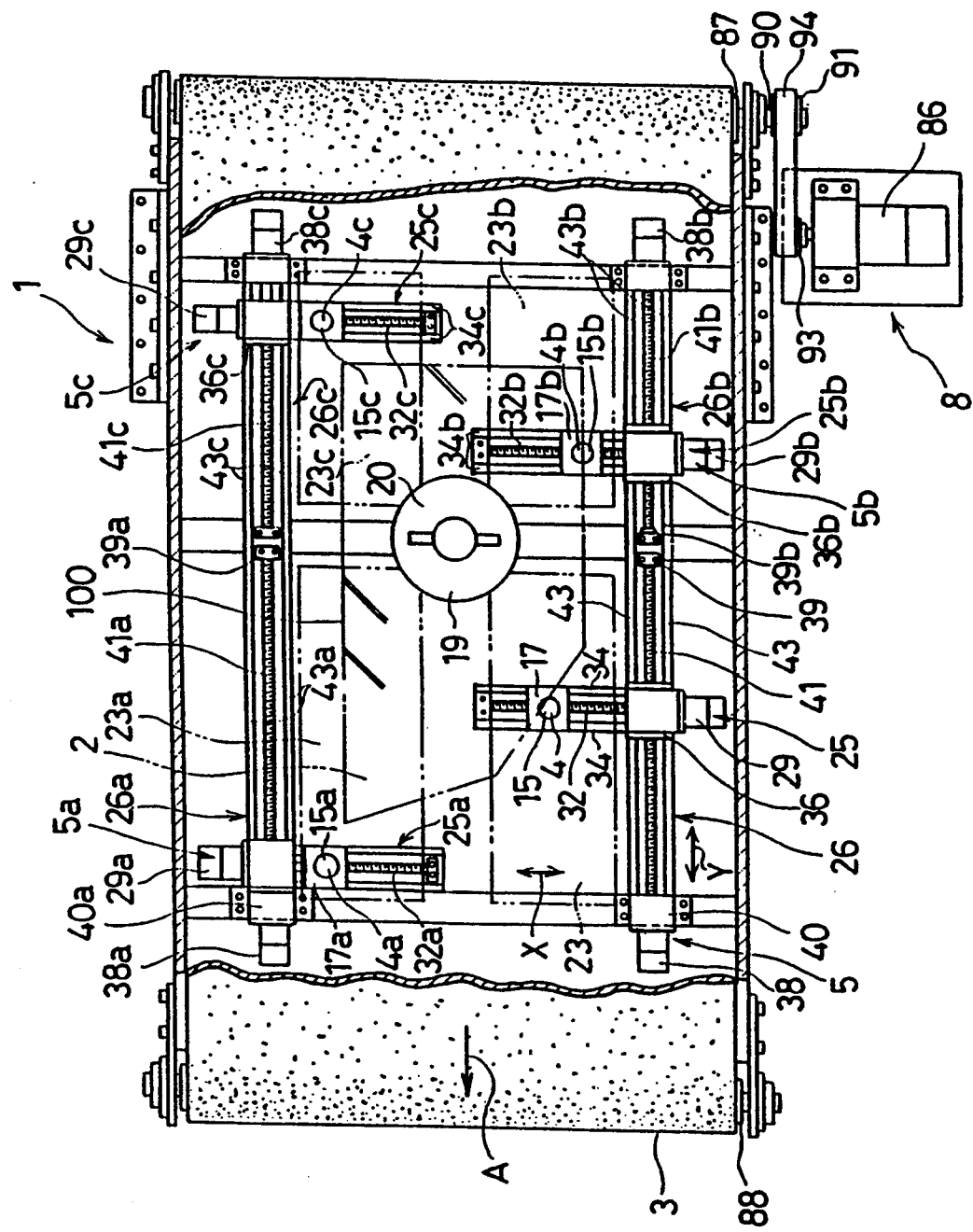
FIG. 3 is a plan view of the embodiment of FIG. 1 with an endless belt and a belt support plate being illustrated partly broken.
Figure 4:
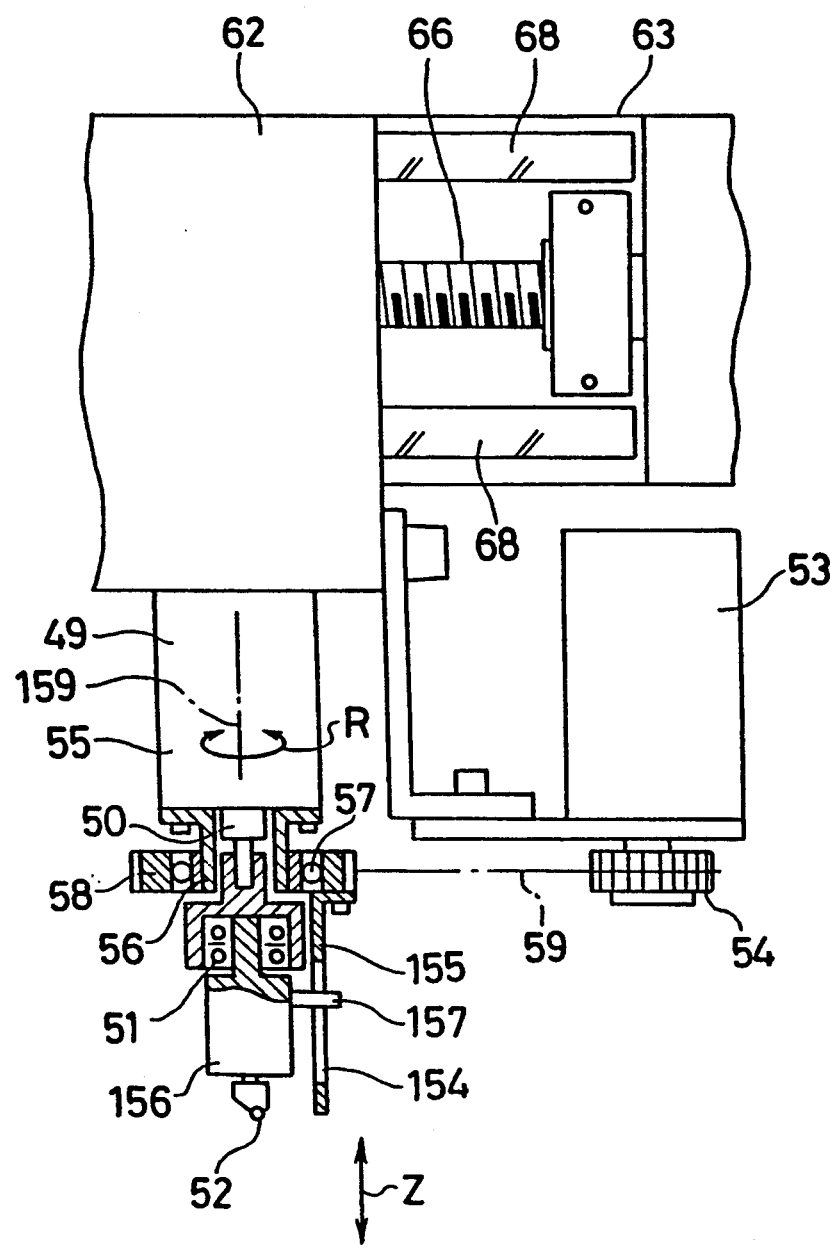
FIG. 4 is a partly detailed front view of the breaking unit of the embodiment of FIG. 1.

Referring to FIGS. 1-4, a glass plate breaking machine 1 is provided with a flexible endless belt 3 on which a glass plate 2 is placed; a plurality of (4, in the present embodiment) glass plate receivers 4, 4a, 4b, 4c disposed on the inner side of the belt 3; a plurality of (4, in the present embodiment) first moving units 5, 5a, 5b, 5c for moving the glass plate receivers 4, 4a, 4b, 4c in one direction and, in the present embodiment, in an X direction which is one direction, and in another direction intersecting with the X direction and, in the present embodiment, a Y direction perpendicular to the X direction, in a plane parallel to a surface of the glass plate 2 and, in the present embodiment, in a horizontal plane; a plurality of (in the present embodiment, 2) breaking units 6, 6a disposed above the endless belt 3; a plurality of (in the present embodiment, 2) second moving units 7 and 7a for moving the respective breaking units 6, 6a in the X direction which is one direction in the horizontal plane and in another direction intersecting with the X direction and, in the present embodiment, the Y direction which is perpendicular to the X direction; a controller 98 which controls the respective operations of the moving units 5, 5a, 5b, 5c and 7, 7a such that the positions of the glass plate receivers 4, 4a, 4b, 4c moved by the moving units 5, 5a, 5b, 5b, 5c correspond to the positions of the breaking units 6, 6a moved by the moving units 7, 7a, in the breaking operation of the breaking units 6, 6a on the glass plate 2 placed on the belt 3; a travel unit 8 for travelling the endless belt 3; and a lifter 9 which lifts the glass plate 2 from the belt 3.

The glass plate receivers 4, 4a, 4b, 4c are the same in structure; the moving units 5, 5a, 5b, 5c are the same in structure; the breaking units 6, 6a are the same in structure; and the moving units 7, 7a are the same in structure. Thus, only the glass plate receiver 4, moving unit 5, breaking unit 6 and moving unit 7 will be below described except especially when required, and the corresponding structures are identified by the same numeral and character a, b or c.

The glass plate receiver 4 is provided with a first surface 15 which supports the glass plate 2 through the endless belt 3 and a second surface 17 disposed at a low position through a step 16 relative to the surface 15. The surface 15 is parallel to and flush with or about 1 to 2 mm higher than an upper surface 20 of a central support base 19 attached at substantially the center of the frame 18 and an upper surface 22 of a belt support plate 21 attached to the frame 18. The surface 17 is disposed low by about 1 to 2 mm relative to the surface 15. The surface 17 is not required to be provided especially on the upper surface of the glass plate receiver 4, but the overall upper surface of the glass plate receiver 4 may function as the surface 15 and the ambience (space) around the glass plate receiver 4 may function as the surface 17.

The belt support plate 21 is provided with four windows or openings 23, 23a, 23b, 23c in correspondence to which the glass plate receivers 4, 4a 4b 4c are disposed so as to move in the X and Y directions within the openings 23, 23a, 23b, 23c, respectively.

The moving unit 5 is composed of an X direction moving mechanism 25 and a Y direction moving mechanism 26. The X direction moving mechanism 25 is provided with a linearly moving base 27 which supports the glass plate receiver 4 and an electric motor 29 attached to the frame 28. The rotational output shaft of the motor 29 is connected to a screw shaft 32 rotatably supported through bearings 30 and 31 in the frame 28. A nut 33 attached to the linearly moving base 27 is threadedly engaged on the screw shaft 32. The linear moving base 27 is supported movable in the X direction through a slider 35 on a pair of rails 34 provided on the frame 28. Thus, the linear moving base 27 is linearly moved in the X direction when the screw shaft 32 is rotated through the rotational output shaft of the motor 29 by the operation of the motor 29.

The Y direction moving mechanism 26 has substantially the same structure as the X direction moving mechanism 25. The Y direction moving mechanism 26 is provided with a linearly moving base 36 which supports the frame 28 receiver 4 and an electric motor 38 attached to the frame 37. The rotational output shaft of the motor 38 is connected to a screw shaft 41 rotatably supported through bearings 39 and 40 in the frame 37. A nut 42 attached to the linear moving base 36 is threadedly engaged oil the screw shaft 41. The linearly moving base 36 is supported movable in the Y direction through a slide 44 on a pair of rails 43 provided on the frame 37. Thus, the linear moving base 36 is linearly moved in the Y direction when the screw shaft 41 is rotated by the rotation of the rotational output shaft of the motor 38 by the operation of the motor 38.

The breaking unit 6 is provided with a push rod 48 attached to a piston rod 47 of an air cylinder unit 46, a cutter blade or wheel 52 attached to a piston rod 50 of an air cylinder 49 through a bearing mechanism 51, and an electric motor 53. The electric motor 53 has a rotational output shaft with a pulley or a gear 54 attached thereto. The air cylinder unit 49 has an outer cylinder 55 to which a pulley or gear 58 is attached through a bracket 56 and a bearing mechanism 57 attached to the bracket 56 with a belt, timing belt or chain 59 extending in common around the gears 54 and 58. Attached to the gear 58 is an engagement member 155 with a slit 154 in which an engagement member 15 attached to a cutter block 156 which supports a cutter blade 52 is provided. The cutter block 156 is attached to a piston rod 50 through the bearing mechanism 51 so as to be rotatable in the R direction around an axis 159.

When the piston rod 47 is extended/retracted by the action of the air cylinder 46 in the braking unit 6, thus constructed, the push rod 48 is moved vertically or in the Z direction. In addition, when the piston rod 50 is extended/retracted by the action of the air cylinder 49, the cutter blade 52 is moved in the Z direction. When the gear 58 is rotated through the chain 59 by the rotation of the gear 54 due to the operation of the motor 53, the engagement member 155 and the engagement member 157 engaged with the engagement member 155 in the slit 154 are rotated around the axis 159 in the R direction. Thus, the cutter blade 52 is rotated around the axis 159 in the R direction to thereby direct its edge in the cutting line forming direction.

The moving unit 7 is composed of an X direction moving mechanism 60 and a Y direction moving mechanism 61. The X direction moving mechanism 60 is provided with a linear moving base 62 which supports air cylinders 46 and 49 and the motor 53 of the braking unit 6 and an electric motor 64 attached to a frame 63. The rotational output shaft of the motor 64 is connected to a bearing 65 and a screw shaft 66 supported rotatably through the bearing 65 to the frame 63. Threaded on the screw shaft 66 is a nut 67 attached to the linearly moving base 62, which is supported movable in the X direction through a slider (not shown) to a pair of rails 68 attached to the frame 63. Thus, the linearly moving base 62 is moved linearly in the X direction when the screw shaft 66 is rotated through the rotational output shaft of the motor 64 by the operation of its motor 64.

The Y direction moving mechanism 61 has substantially the same structure as the X direction moving mechanism 60 and is provided with a linearly moving base 70 which supports the frame 63 and an electric motor 72 attached to an upper transverse member 71. The rotational output shaft of the motor 72 is connected to a screw shaft 73 supported rotatably through a bearing (not shown) to the transverse member 71. Threaded on the screw shaft 73 is a nut 74 attached to the linearly moving base 70, which is hung so as to be movable in the Y direction through a slider 76 to a pair of rails 75 formed on the upper transverse member 71. Thus, the linearly moving base 70 is moved linearly in the Y direction when the screw shaft 73 is rotated through the rotational output shaft of the motor 72 by the operation of its motor 72. The upper transverse member 71 is attached to the upper frame 80.

The travel unit 8 is provided with an electric motor 86 attached to a base 85, a driver drum 87 and a follower drum 88. The drums 87 and 88 are attached rotatably to the frame 18 and a frame 89 supported by the base 85, respectively. A belt 3 extends in common around the drums 87 and 88. A belt 94 extends in common around pulleys 91 and 93 with the pulley 91 attached to one end of a center shaft 90 of the driver drum 87 and the pulley 93 being attached to a rotational output shaft 92 of the motor 86. When the motor 86 is driven and hence its rotational output shaft 92 is rotated, the driver drum 87 is rotated through the pulley 93, belt 94, pulley 91 and center shaft 90. The belt 3 is moved, for example, in the A direction by the rotation of the driver drum 87, so that the belt 3 carries and discharges cullet, produced on the belt 3, in the A direction.

The lifter 9 is provided with an air cylinder unit 95 attached to an upper frame 80 and a vacuum sucking unit 97 attached to an end of a piston rod 96 of the air cylinder 95. When the piston rod 96 of the air cylinder unit 95 is moved in the Z direction by the operation of the air cylinder 95, the sucking unit 97 lifts the glass plate 2, placed on the belt 3, or holds the glass plate 2 placed on the belt 3 in cooperation with the central support base 19 through the belt 3 to fix it to the 3.

The controller 98 which includes a microcomputer controls the operation of the motors 29, 38, 53, 64, 72 and 86 and air cylinder units 46, 49, and 95 and the vacuum sucking unit 97 with numerical value control commands programmed beforehand. The controller 98 itself is well known and further description thereof will be omitted.

The glass plate breaking machine 1 of the present embodiment, thus constructed, performs a braking operation on the glass plate 2 as follows:

First, a glass plate 2 with a breaking line 100 formed beforehand thereon is placed on the belt 3. Such breaking line 100 may be formed by the glass plate breaking machine 1 of the present embodiment. The air cylinder unit 95 is then actuated to lower the vacuum sucking unit 97 to hold and fix the glass plate 2 between the sucking unit 97 and the central support base 19. Thereafter, the motors 29, 29a, 38, 38a are operated to move the glass plate receivers 4, 4a in the X and Y directions such that the surfaces 15, 15a are disposed below the cutter blades 52, 52a. Simultaneously, the motors 64, 64a, 72, 72a are operated to move the breaking units 6, 6a in the X and Y directions to thereby move the cutter blades 52, 52a radially from the breaking line 100 as the starting point. When the cutter blades 52, 52a are moved from the breaking line 100, the air cylinder units 49, 49a are operated simultaneously so as to cause the cutter blades 52, 52a to abut on and form corresponding end cutting lines (auxiliary cutting line) on the glass plate 2.

The motor 53 is operated during the formation of the end cutting lines in order to direct the edges of the cutter blades 52, 52a toward the end cutting line forming direction. The push rods 48, 48a remain lifted without abutting on the glass plate 2 during the formation of the end cutting line.

When one end cutting line is formed in this way, the braking units 6, 6a and glass plate receivers 4, 4a are moved to the next end cutting line forming position. The cutter blades 52, 52a form end cutting lines in the regions of the windows 23, 23a, respectively. The glass plate receivers 4, 4a are moved in correspondence to the movements of the cutter blades 52, 52a during the formation of the end cutting lines such that the surfaces 15, 15a receive the pressing forces of the cutter blades 52, 52a through the glass plate 2 and belt 3.

When the formation of end cutting lines ends in the regions of the windows 23, 23a, the cutter blades 52, 52a are moved into the regions of the windows 23b, 23c. Simultaneously, the motors 29b, 29c and 38b, 39c are operated to move the glass plate receivers 4b, 4c in the X and Y directions such that the surfaces 15b, 15c are disposed below the cutter blades 52, 52a to thereby form the end cutting lines in the regions of the windows 23b, 23c in a manner similar to that mentioned above.

When the formation of end cutting lines in the windows 23b, 23c also ends, the air cylinder units 49, 49a are operated to lift the cutter blades 52, 52a to release the abutment of the cutter blades 52, 52a on the glass plate 2. The motors 29b, 29c and 38b, 38c are then operated such that the steps 16b, 16c are positioned at the predetermined braking line 100 and that the surfaces 17b, 17c are positioned at all times outside the braking line 100 to thereby move the glass plate receivers 4b, 4c in the X and Y directions. Simultaneously, the motors 64, 64a and 72, 72a are operated to move the braking units 6, 6a in the X and Y directions such that the push rods 48, 48a are at all times positioned outside the breaking line 100. The air cylinders 46, 46a are operated at required positions during the movement of the glass plate receivers 4b, 4c and the braking units 6, 6a along the braking line 100 to lower the push rods 48, 48a so as to abut on the glass plate 2 outside the breaking line 100 to thereby break the glass plate 2 along the breaking line.

When breakage of the glass plate along the breaking line 100 in the regions of the windows 23b, 23c ends, the push rods 48, 48a are moved in the regions of the windows 23, 23a. Simultaneously, the motors 29, 29a and 38, 38a are operated to move the glass plate receivers 4, 4a in the X and Y directions to position the steps 16, 16a at the breaking line 100 and the surfaces 17, 17a are positioned at all times outside the breaking line 100 to perform the breaking operation in the regions of the windows 23, 23a in a manner similar to that mentioned above.

When breakage of the glass plate in the regions of the windows 23, 23a also ends and the glass plate 2 broken along the breaking line 100 is produced, the air cylinder unit 95 is operated such that the vacuum sucking unit 97 is lifted and the glass plate 2 sucked by the sucking unit 97 is lifted from the belt 3. When the motor 86 is operated under the conditions where the glass plate 2 is lifted and the belt 3 is moved in the direction A, the cullet remaining on the belt 3 is carried and discharged in the direction A by the movement of the belt 3. After the discharge of the cullet, the air cylinder unit 95 is again operated to lower the sucking unit 97 to thereby place on the belt 3 the glass plate 2 sucked by the sucking unit 97 and the operation of the sucking unit 97 is then stopped. The piston rod 96 is lifted, so that the glass plate 2 is removed from the belt 3 and a new glass plate 2 to be broken is placed instead on the belt 3.

Since in the glass plate breaking machine 1 the belt support plate 21 with the windows 23, 23a, 23b, 23e supports the flexible belt 3 and the glass plate receivers 4, 4a, 4b, 4c are disposed in correspondence to the windows 23, 23a, 23b, 23c, extreme hanging of the belt 3 is prevented and the movement of the glass plate receivers 4, 4a, 4b, 4c is performed without troubles to thereby to perform a very rapid breaking operation.

While in the embodiments the two breaking units 6, 6a and two moving units 7, 7a are shown as constituting the glass plate breaking machine, the present invention is not limited to it. Breaking units and moving units which are the same in number as the glass plate receivers 4 may be provided. Alternatively, a single breaking unit and a single moving unit may be used. In this case, the moving unit is arranged to move the breaking unit in the rotational direction around the lifter 9 in the horizontal plane and around the lifter 9 in a radial linear direction from the lifter 9 in the horizontal plane.

Figure 5:
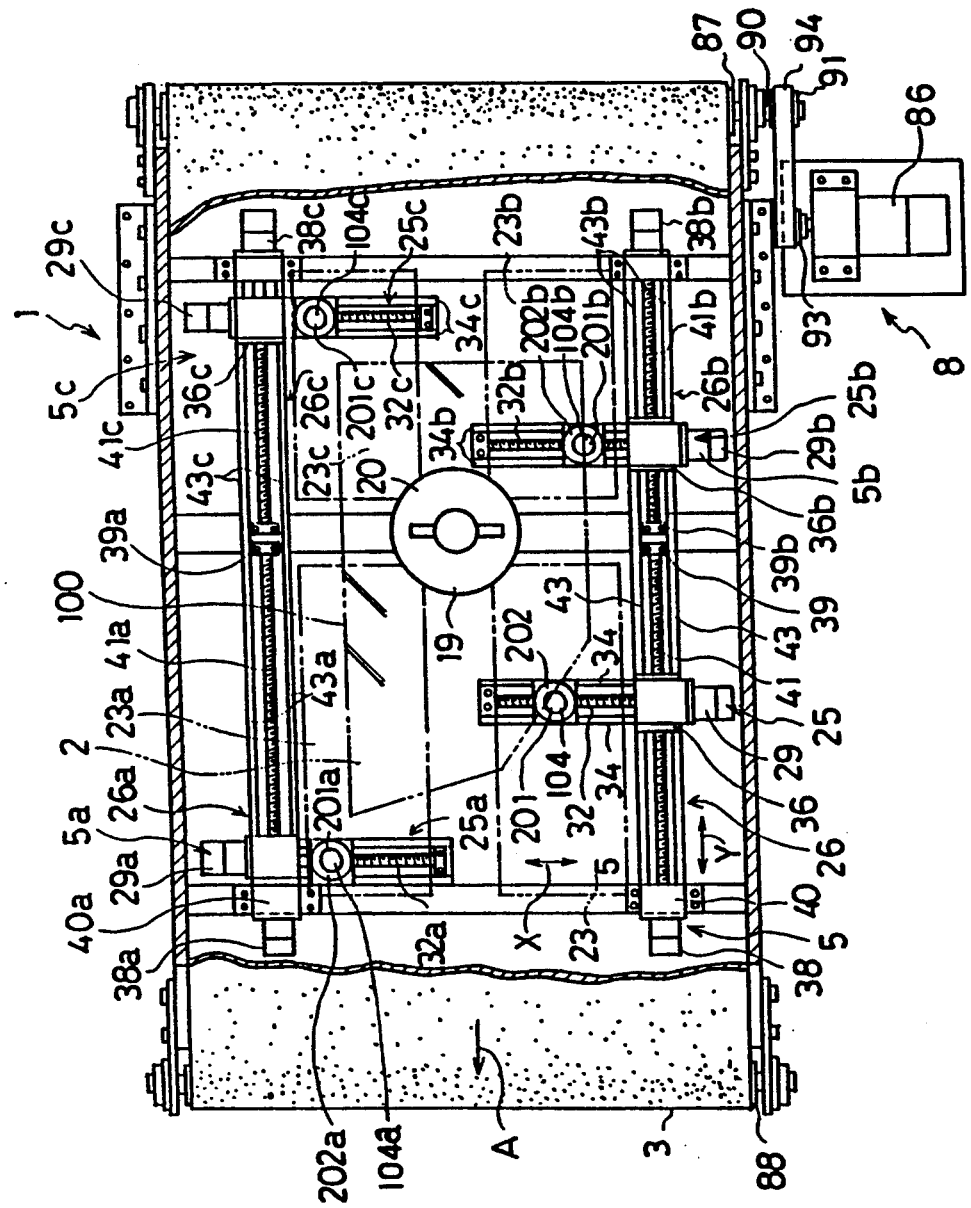
FIG. 5 is a plan view of another preferred embodiment of the present invention with an endless belt and a belt support plate being illustrated partly broken.
Figure 6:
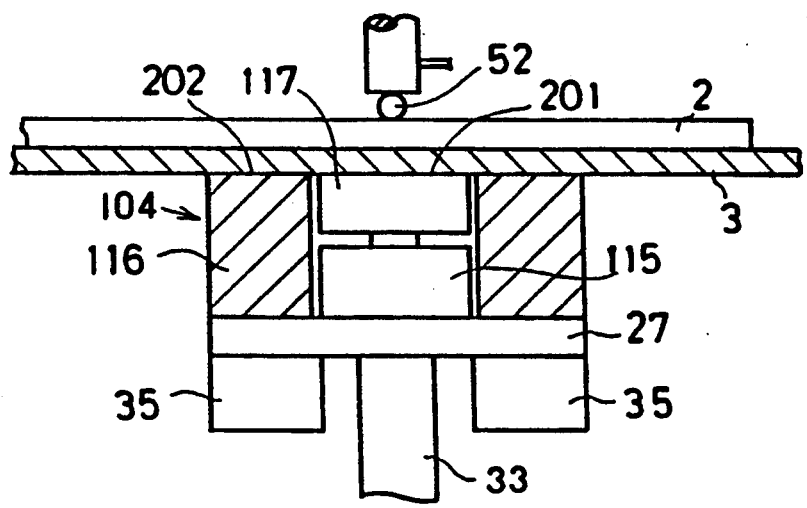
FIG. 6 shows the details of a glass plate receiver of the embodiment of FIG. 5 with a disc being lowered.
Figure 7:
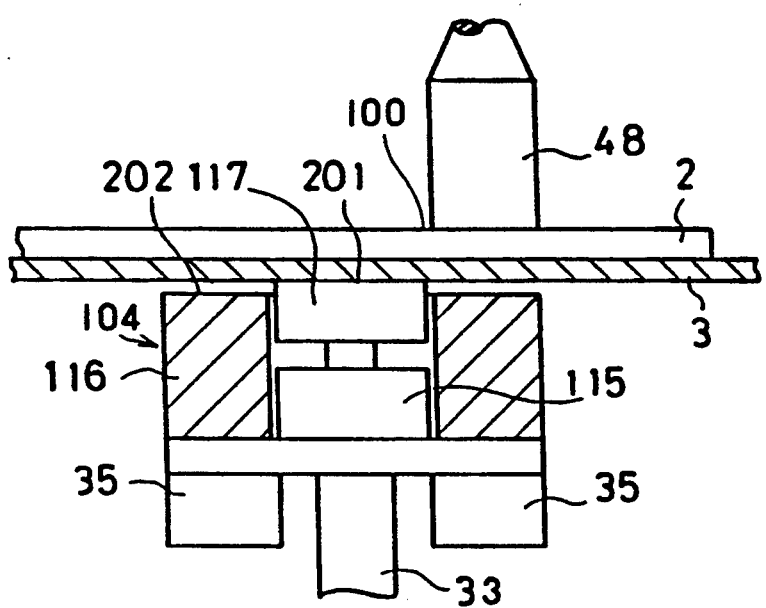
FIG. 7 shows the details of the glass plate receiver of the embodiment of FIG. 5 with a raised disc.

While in the aforementioned description the glass plate breaking machine 1 is illustrated as being composed of the glass plate receivers 4, 4a, 4b, 4c with the fixed surfaces 15, 15a, 15b, 15c, a glass plate breaking machine 1 may be composed of glass plate receivers 104, 104a, 104b, 104c shown in FIGS. 5–7 in place of the glass plate receivers 4, 4a, 4b, 4c. Since the glass plate receivers 104, 104a, 104b, 104c are composed so as to have the same structure as in the above case, only the glass plate receivers 104 will be described below except especially when required and the corresponding glass plate receivers are shown with the same numeral and character a, b or c.

As shown in FIGS. 5–7, the glass plate receiver 104 is provided with a cylinder unit 115 and a cylinder unit 116 which surrounds the cylinder unit 115. The piston rod of the cylinder unit 115 has attached thereto a disc 117 having an upper surface 201 as a movable support surface which is movable to/from the lower surface of the glass plate 2. An annular surface 202 of the cylinder 116 disposed around the periphery of the upper surface 201 is handled as another fixed support surface. While in the present embodiment the cylinder unit 115 is composed of the air cylinder, it may be composed of a hydraulic cylinder in place of the air cylinder. The vertical movement of the disc 117 due to feed/discharge of a pressurized air to/from the cylinder unit 115 moves the upper surface 201 vertically or in the Z direction to thereby move to/from the lower surface of the glass plate 2. The upper surface 202 is parallel to and flush with the upper surface 20 of the central support base 19 attached to substantially the center of the frame 18 (see FIG. 1), and the upper surface 22 of the belt support plate 21 (see FIG. 1) attached to the frame 18. As shown in FIG. 6, the upper surface 201 is flush with the upper surface 202 at the lower position of the disc 117 while as shown in FIG. 7 the upper surface 201 is high by about 1 mm relative to the upper surface 202 with the belt 3 being somewhat raised at the raised position of the disc 117. Since the upper surface 201 is disposed high relative to the upper surface 202, as just mentioned, an annular step is formed between the upper surfaces 201 and 202. The glass plate receiver 104 which is provided with the cylinder unit 115 and the cylinder 116 is attached to the linearly moving base 27 of the X direction moving mechanism 25.

When the cutter blade forms an end cutting line in the glass plate breaking machine 1 which uses the glass plate receivers 104, 104a, 104b, 104c, the disc 117 is disposed at the lower position by the operation of the cylinder unit 115 such that the upper surfaces 201 and 202 are flush with each other as shown in FIG. 6. Thus, the upper surface 201 which is made flush with the upper surface 202 in this way is moved in correspondence to the movement of the cutter blade 52 in a manner similar to that mentioned above such that the upper surface 201 receives the push force of the cutter blade 52 through the glass plate 2 and belt 3. On the other hand, in the breakage of the glass plate by the push rod, a predetermined step formed between the upper surfaces 201 and 202 is positioned at the predetermined breaking line 100 and the glass plate receiver is moved such that the upper surface 201 is positioned at all times inside the breaking line 100. When the push rod 48 is lowered, the cylinder unit 115 is operated, a step shown in FIG. 7 is formed between the upper surfaces 201 and 202, and the disc 117 is moved to the upper position such that the glass plate 2 is supported from below through the belt 3 inside the breaking line 100.

When the cutter blade is forming the end cutting line in the glass plate breaking machine 1 which uses the glass plate receivers 104, 104a, 104b, 104c, the upper surfaces 201 and 202 are flush with each other and the glass plate 2 is supported from below through the belt 3. Therefore, the positioning of the glass plate receivers 104, 104a, 104b, 104c relative to the cutter blade deviates slightly, so that even if the cutter blade is disposed, for example, above the upper surfaces 202, 202a, 202b, 202c, a desired end cutting line is formed because the glass plate 2 is supported from below by the upper surfaces 202, 202a, 202b, 202c.

In other words, the positioning of the glass plate receivers 104, 104a, 104b, 104c relative to the cutter blade does not require a very strict accuracy. Since the glass plate 2 is supported from below over a wide area, the glass plate 2 is held in a horizontal plane during the formation of the end cutting line.

I claim:

1. A machine for breaking glass plate comprising: a flexible belt means on which a glass plate is placed; a first moving means for moving the belt means; a belt support plate with a window for supporting the belt means; a glass plate supporting means for supporting the glass plate through the belt means in the window; a second moving means for moving the glass plate supporting means in a plane parallel to a surface of the glass plate; a breaking means disposed above the belt means; a third moving means for moving the breaking means in a plane parallel to the surface of the glass plate; and a controller for controlling the operation of the second and third moving means such that the position of the glass plate supporting means moved by the second moving means corresponds to the position of the breaking means moved by the third moving means during a breaking operation of said breaking means for the glass plate on the belt means, the glass plate supporting means being movable to and from a lower surface of the glass plate and having a movable support surface supporting the glass plate through the belt means.

2. A machine for breaking a glass plate according to claim 1, wherein the glass plate supporting means has a further support surface for supporting the glass plate through the belt means.

3. A machine for breaking a glass plate according to claim 2, wherein the glass plate supporting means comprises a cylinder means, the movable support surface provided on a piston rod of said cylinder means, the further support surface being disposed around the movable support surface.

4. A machine for breaking a glass plate comprising: a flexible belt means on which a glass plate is placed; a first moving means for moving the belt means; a belt support plate with a plurality of windows for supporting the belt means; a plurality of glass plate supporting means each disposed at the corresponding window for supporting the glass plate through the belt means; a plurality of second moving means each for moving the corresponding glass plate supporting means in a plane parallel to a surface of the glass plate; a breaking means disposed above the belt means; a third moving means for moving the breaking means in a plane parallel to the surface of the glass plate; and a controller for controlling operation of the second and third moving means such that the position of the glass plate supporting means moved by the second moving means corresponds to the position of the breaking means moved by the third moving means during a breaking operation of the breaking means for the glass plate on the belt means, the respective glass plate supporting means being movable to and from a lower surface of the glass plate and having a movable support surface for supporting the glass plate through the belt means.

5. A machine for breaking a glass plate according to claim 4, wherein the respective glass plate supporting means has a further support surface for supporting the glass plate through the belt means.

6. A machine for breaking a glass plate according to claim 5, wherein the glass plate supporting means each comprises a cylinder means, the respective movable support surface being provided on a piston rod of the corresponding cylinder means, the respective further support surface being disposed around the corresponding movable support surface.

7. A machine for breaking a glass plate according to claim 4, wherein said second moving means each include a moving mechanism for moving the corresponding glass plate supporting means in a first direction and in a second direction intersecting with the first direction.

8. A machine for breaking a glass plate comprising: a flexible belt means on which the glass plate is placed; a first moving means for moving the belt means; a belt support plate with a plurality of windows for supporting the belt means; a plurality of supporting members for supporting the glass plate, each member being disposed at the corresponding window and having a surface for supporting the glass plate through the belt means; a plurality of second moving means each for moving the corresponding member for supporting the glass plate in a plane parallel to a surface of the glass plate; a breaking means disposed above the belt means; a third moving means for moving the breaking means in a plane parallel to the surface of the glass plate; and a controller for controlling the operation of the second and third moving means such that the position of the supporting member moved by the second moving means corresponds to the position of the breaking means moved by the third moving means during a breaking operation of the said breaking means for the glass plate on the belt means.

9. A machine for breaking a glass plate according to claim 8, wherein said second moving means each include a moving mechanism for moving the corresponding supporting member in a first direction and in a second direction intersecting with the first direction.

* * * * *

UNITED STATES PATENT AND TRADEMARK OFFICE
CERTIFICATE OF CORRECTION

PATENT NO. : 5,400,939
DATED : March 28, 1995
INVENTOR(S) : Shigeru Bando It is certified that error appears in the above-identified patent and that said letters patent is hereby corrected as shown below:

At column 10, line 51, after "surface" insert --for--.

Signed and Sealed this

Thirteenth Day of June, 1995

Attest:

BRUCE LEHMAN

*Attesting Officer*   *Commissioner of Patents and Trademarks*